United States Patent
Schoeffel et al.

[11] Patent Number: 5,347,848
[45] Date of Patent: Sep. 20, 1994

[54] APPARATUS FOR MEASURING A HYDRAULIC FLUID FLOW RATE AND/OR LEAKAGE RATE THROUGH AN OBJECT TO BE TESTED

[75] Inventors: Eberhard Schoeffel; Josef Ernst, both of Bamberg, Fed. Rep. of Germany

[73] Assignee: Robert Bosch GmbH, Stuttgart, Fed. Rep. of Germany

[21] Appl. No.: 4,989

[22] Filed: Jan. 15, 1993

[30] Foreign Application Priority Data

Feb. 22, 1992 [DE] Fed. Rep. of Germany ....... 4205453

[51] Int. Cl.$^5$ .................. G01M 3/02; G01M 3/04
[52] U.S. Cl. ................................ 73/37; 73/40
[58] Field of Search .............. 73/40, 49.2 R, 49.2 T, 73/37, 304 C; 324/659; 340/612

[56] References Cited

U.S. PATENT DOCUMENTS

| | | | |
|---|---|---|---|
| 2,281,125 | 7/1940 | Wiemer | 73/49.5 |
| 2,939,314 | 6/1960 | Prince | 73/40 |
| 4,417,465 | 11/1983 | Noe et al. | 73/49.5 |
| 4,590,793 | 5/1986 | Staats, Jr. | 73/40 |
| 4,987,776 | 1/1991 | Koon | 340/612 |
| 5,017,909 | 5/1991 | Goekler | 73/304 C |
| 5,065,616 | 11/1991 | Schuster | 73/40 |
| 5,068,653 | 11/1991 | Klingler et al. | 324/659 |
| 5,152,167 | 10/1992 | Moody | 73/40 |

FOREIGN PATENT DOCUMENTS 0163430 12/1980 Japan ................................ 73/49.5

*Primary Examiner*—Hezron E. Williams
*Assistant Examiner*—Daniel S. Larkin
*Attorney, Agent, or Firm*—Michael J. Striker

[57] ABSTRACT

The apparatus for measuring a hydraulic fluid flow rate and/or leak rate through an object, particularly a valve, includes an approximately vertical measurement tube, a capacitive sensor mounted on the measurement tube, an equalization vessel extending vertically next to the measurement tube, and a source of hydraulic fluid connected to the equalization vessel and the measurement tube below the capacitive sensor and a source of a pneumatic medium connected to both the equalization vessel and the measurement tube above the capacitive sensor. Hydraulic and pneumatic valves are also provided so that hydraulic fluid can be accommodated in a lower part of the equalization vessel and pneumatic medium in an upper part. A connector tube with a connector valve is connected to the equalization vessel at about the level of the capacitive sensor so that the level of hydraulic fluid can be set at the capacitive sensor in the measurement tube at the beginning of the measurement. The capacitance rate of change is a measure of the hydraulic fluid flow or leak rate.

5 Claims, 1 Drawing Sheet

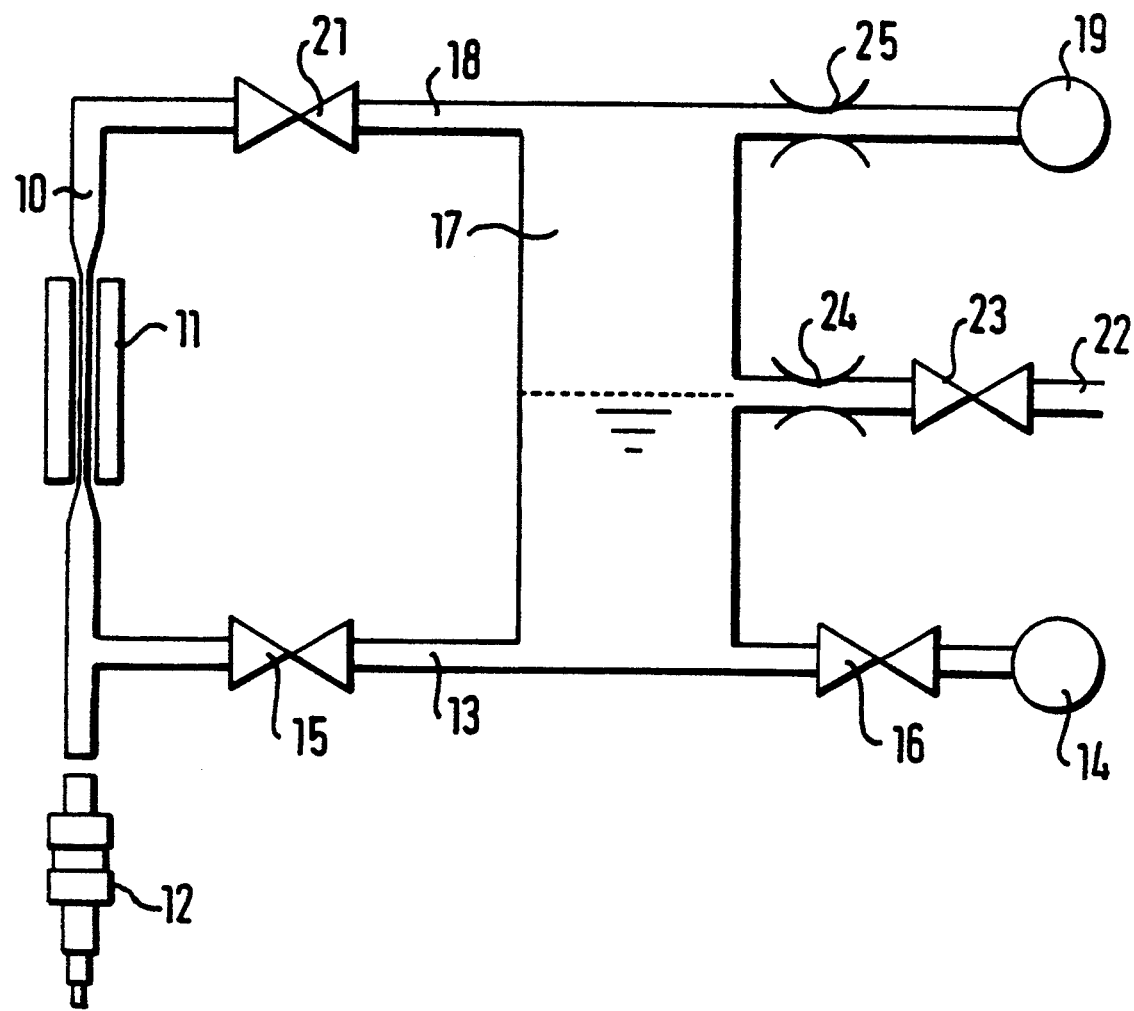

5,347,848

APPARATUS FOR MEASURING A HYDRAULIC FLUID FLOW RATE AND/OR LEAKAGE RATE THROUGH AN OBJECT TO BE TESTED

BACKGROUND OF THE INVENTION

The present invention relates to an apparatus for measuring a comparatively small hydraulic fluid flow rate and/or leakage rate through an object to be tested, for example a valve, especially an injector valve.

An apparatus of this type is generally comparatively expensive, since it requires very costly measuring instruments, which lead to an expensive apparatus.

SUMMARY OF THE INVENTION

It is an object of the present invention to provide an improved apparatus for measuring a hydraulic fluid flow rate and/or leak rate from an object to be tested.

According to the invention, the apparatus for measurement of a hydraulic fluid flow rate and/or leakage rate of an object to be tested comprises an approximately vertically oriented measurement tube connectable to an object to be tested; a capacitive sensor mounted on the measurement tube so that a hydraulic medium in the measurement tube can act on the capacitive sensor, the hydraulic medium being pressurized with a pneumatic pressure greater than a hydraulic pressure of the hydraulic medium; and an equalization vessel connectable to the measurement tube to communicate with the measurement tube, the hydraulic fluid and a pneumatic medium being accommodated in the equalization vessel as well as the measurement tube.

The invention has the advantage that it is extraordinarily simple and is particularly suitable for use in quality control of mass-produced devices that require leak testing.

Advantageously in a preferred embodiment of the invention the equalization vessel extends substantially vertically adjacent the measurement tube and is connected to the measurement tube above and below the capacitive sensor, and a connector tube including a connector tube valve is connected to the equalization vessel at about the same level as the capacitive sensor at one end and at its other end is open to the atmosphere.

In the preferred embodiment a feed tube containing at least one hydraulic shut-off valve is provided for a hydraulic fluid and is connected to the measurement tube below the capacitive sensor and to a source of hydraulic fluid and another feed tube for the pneumatic medium containing a pneumatic shut-off valve is connected to the measurement tube above the capacitive sensor and also to a source of a pneumatic medium.

The object to be tested is advantageously connected to the measurement tube below the capacitive sensor and below the feed tube for the hydraulic medium and both feed tubes are connected to the equalization vessel.

It is particularly advantageous that the apparatus of the invention has no moving parts except for the valves so that no leak can occur during testing. The apparatus has a satisfactory linear response and calibration since the test pressure is maintained constant during the testing of an object to be tested.

BRIEF DESCRIPTION OF THE DRAWING

The objects, features and advantages of the present invention will now be illustrated in more detail by the following detailed description, reference being made to the accompanying drawing in which:

The sole FIGURE is a schematic diagram of the apparatus for measurement of a hydraulic fluid leak rate and/or leakage rate from an object to be tested.

DETAILED DESCRIPTION OF THE INVENTION

In the preferred embodiment shown in the drawing the apparatus for measurement of a hydraulic fluid flow rate and/or a leak rate from an object to be tested 12 has an approximately vertical measurement tube 10 on which a capacitive sensor 11 is mounted, approximately in the middle of the measurement tube 10. At the free lower end of the measurement tube 10 the object to be tested 12 is connected, for example an injector valve, whose fluid flow rate or leakage rate is to be measured. A means of connection, such as an appropriate internal thread, is provided on the tube 10 for this purpose.

A feed pipe 13 is connected to the measurement tube 10 between its lower free end and the capacitive sensor 11 near the lower free end of the measurement tube 10. The feed pipe 13 is also connected to a source 14 of pressurized hydraulic medium or fluid. Two hydraulic shut-off valves 15, 16 are provided in this feed pipe 13 spaced from each other. An equalization vessel 17 is connected in the feed pipe 13 between the hydraulic shut-off valves 15, 16 so that it can communicate with the source 14 of hydraulic fluid and the measurement tube 10 when the valves 15, 16 are opened. The equalization vessel 17 extends substantially vertically next to the measurement tube 10 from the feed pipe 13 to another feed pipe 18 which connects the measurement tube 10 to a high pressure source 19 of a pneumatic medium. The equalization vessel 17 is connected to the other feed tube 18, which is connected to the measurement tube 10 above the capacitive sensor 11. A pneumatic shut-off valve 21 is provided in the other feed tube 18 between the measurement tube 10 and the equalization vessel 17. As shown in the drawing figure a connector tube 22 which is open at one end to the atmosphere or surroundings for pressure adjustment is connected at its other end to the equalization vessel 17 at about the level or height of the capacitive sensor 11. A throttle 24 and a connector tube valve 23 are connected in series in the connector tube 22. Another throttle portion 25 connects the source of pressurized medium 19 and the equalization vessel 17.

In operation of the apparatus according to the invention, the object 12 to be tested is connected to the measurement tube 10 and all the hydraulic and pneumatic valves 15, 16 and 21 and the connector tube valve 23 are opened. The pneumatic pressure is set higher than the hydraulic pressure, and the hydraulic fluid level in the system adjusts to the level shown with dotted lines at the level of the connector tube valve 23. For measurement of the leakage rate or injection rate of the valve of the object 12 to be tested, the hydraulic shut-off valves 15, 16 and the connector tube valve 23 are closed, so that the hydraulic fluid level is initially the same at sensor 11 and in the equalization vessel 17. A test pressure builds up subsequently in the fluid column at the sensor 11 according to the pneumatic pressure on that column provided by the pressurized medium. The hydraulic fluid level at the sensor drops or decreases according to the flow rate or leak rate from the object being tested and because of that the capacitance of the capacitive sensor 11 changes, i.e. the change in the hydraulic fluid level causes a proportional change in the sensor's capacitance. The capacitance change per unit time is a measure of the leakage rate.

It will be understood that each of the elements described above, or two or more together, may also find a useful application in other types of constructions differing from the types described above.

While the invention has been illustrated and described as embodied in an apparatus for measuring a hydraulic fluid flow rate and/or leakage rate through an object to be tested, especially a valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An apparatus for measurement of a hydraulic fluid flow rate through an object to be tested, said apparatus comprising an approximately vertically oriented measurement tube connectable to an objected to be tested; a capacitive sensor mounted on the measurement tube so that a hydraulic medium in the measurement tube can act on the capacitive sensor, said hydraulic medium being pressurized with a pneumatic pressure greater than a hydraulic pressure of the hydraulic medium; an equalization vessel extending substantially vertically adjacent to the measurement tube and connected to the measurement tube to communicate with the measurement tube, the hydraulic fluid and a pneumatic medium; a connector tube; and a connector tube valve in the connector tube, said connector tube being open to the atmosphere at one end thereof and, at another end, being connected to the equalization vessel, and the connector tube valve being located at about the level of the capacitive sensor.

2. An apparatus as defined in claim 1, further comprising a feed tube for the hydraulic fluid and at least one hydraulic shut-off valve in the feed tube, said feed tube being connected to the measurement tube below the capacitive sensor and being connectable to a source of the hydraulic fluid and another feed tube for the pneumatic medium and a pneumatic shut-off valve located in the other feed tube, said other feed tube being connected to the measurement tube above the capacitive sensor and also being connectable to a source of the pneumatic medium, 3. An apparatus for measurement of a hydraulic fluid flow rate through an object to be tested, said apparatus comprising an approximately vertically oriented measurement tube connectable to an object to be tested; a capacitive sensor mounted on the measurement tube so that a hydraulic medium in the measurement tube can act on the capacitive sensor, said hydraulic medium being pressurized with a pneumatic pressure greater than a hydraulic pressure of the hydraulic medium; an equalization vessel connectable to the measurement tube to communicate with the measurement tube, the hydraulic fluid and a pneumatic medium; a feed tube for the hydraulic fluid and at least one hydraulic shut-off valve in the feed tube, said feed tube being connected to the measurement tube below the capacitive sensor and being connectable to a source of the hydraulic fluid; another feed tube for the pneumatic medium and a pneumatic shut-off valve located in the other feed tube, said other feed tube being connected to the measurement tube above the capacitive sensor and also being connectable to a source of the pneumatic medium, wherein the object to be tested is connectable to the measurement tube below the capacitive sensor and below the feed tube for the hydraulic medium and both feed tubes communicate with the equalization vessel.

4. An apparatus for measurement of a hydraulic fluid flow rate through an object to be tested, said apparatus comprising an approximately vertically oriented measurement tube connectable to an object to be tested; a capacitive sensor mounted on the measurement tube so that a hydraulic medium in the measurement tube can act on the capacitive sensor, said hydraulic medium being pressurized with a pneumatic pressure greater than a hydraulic pressure of the hydraulic medium; an equalization vessel connectable to the measurement tube to communicate with the measurement tube the hydraulic fluid and a pneumatic medium; a feed tube for the hydraulic fluid and at least one hydraulic shut-off valve in the feed tube, said feed tube being connected to the measurement tube below the capacitive sensor; another feed tube for the pneumatic medium and a pneumatic shut-off valve located in the other feed tube, said other feed tube being connected to the measurement tube above the capacitive sensor and also being connectable to a source of the pneumatic medium and a source of the hydraulic fluid connected to the feed tube connected to the measurement tube below the capacitive sensor.

5. An apparatus for measurement of a hydraulic fluid flow rate through an object to be tested, said apparatus comprising an approximately vertically oriented measurement tube connectable to an object to be tested; a capacitive sensor mounted on the measurement tube so that a hydraulic medium in the measurement tube can act on the capacitive sensor, said hydraulic medium being pressurized with a pneumatic pressure greater than a hydraulic pressure of the hydraulic medium; an equalization vessel connectable to the measurement tube to communicate with the measurement tube, the hydraulic fluid and a pneumatic medium; a feed tube for the hydraulic fluid and at least one hydraulic shut-off valve in the feed tube, said feed tube being connected to the measurement tube below the capacitive sensor and being connectable to a source of the hydraulic fluid and another feed tube for the pneumatic medium and a pneumatic shut-off valve located in the other feed tube, said other feed tube being connected to the measurement tube above the capacitive sensor and a source of the pneumatic medium connected to the other feed tube connected to the measurement tube above the capacitive sensor.

* * * * *